Figure 3:
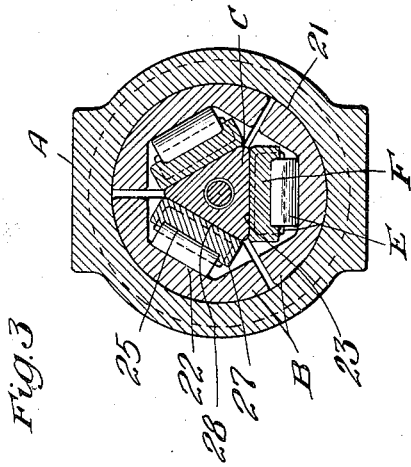

J. F. O'CONNOR.
FRICTION SHOCK ABSORBING MECHANISM.
APPLICATION FILED FEB. 16, 1918.

1,284,755.

Patented Nov. 12, 1918.

INVENTOR.
John F. O'Connor
BY Geo. I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,284,755. Specification of Letters Patent. Patented Nov. 12, 1918.

Application filed February 16, 1918. Serial No. 217,508.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism, and more particularly, such mechanism when applied to railway draft riggings.

Heretofore, in many friction draft gears it has been customary to employ a friction shell, a series of friction shoes, a central wedge and an anti-friction roller between each shoe and the main wedge. Due to the use of a single roller, which has been employed to effect a certain release, it is evident that the pressure from the main wedge to each of the shoes is concentrated along single lines with the result that great care must be exercised in manufacturing the shoes from material which will be of sufficient strength and hardness to prevent the rolls from indenting the shoes. The care thus required in obtaining the proper metal and design of shoe to withstand the concentrated pressures materially increases the cost of the shoes. To overcome this difficulty, it has heretofore been suggested to employ a plurality of anti-friction rollers instead of a single roller between each shoe and the wedge to thereby distribute the pressures over larger areas and avoid the concentration of pressure hereinbefore referred to. However, due to the fact that all of the parts of these types of friction gears are substantially necessarily manufactured without machining in order to keep down the manufacturing cost, it has been found impracticable to utilize a plurality of rollers as suggested for the reason that proper bearings are not insured by the method of manufacture referred to. In other words, where a plurality of anti-friction rollers are employed between two surfaces that are not accurately machined, one roller may be in proper engagement with the opposed surfaces while an adjacent roller will not be in proper engagement, with consequent danger of failure in operation.

The object of my invention is to provide a friction shock absorbing mechanism employing a plurality of anti-friction rollers between each friction shoe and the main wedge and wherein a simple expedient is employed to insure proper bearing of the plurality of rollers on the opposed surfaces between which they are located.

Figure 1:
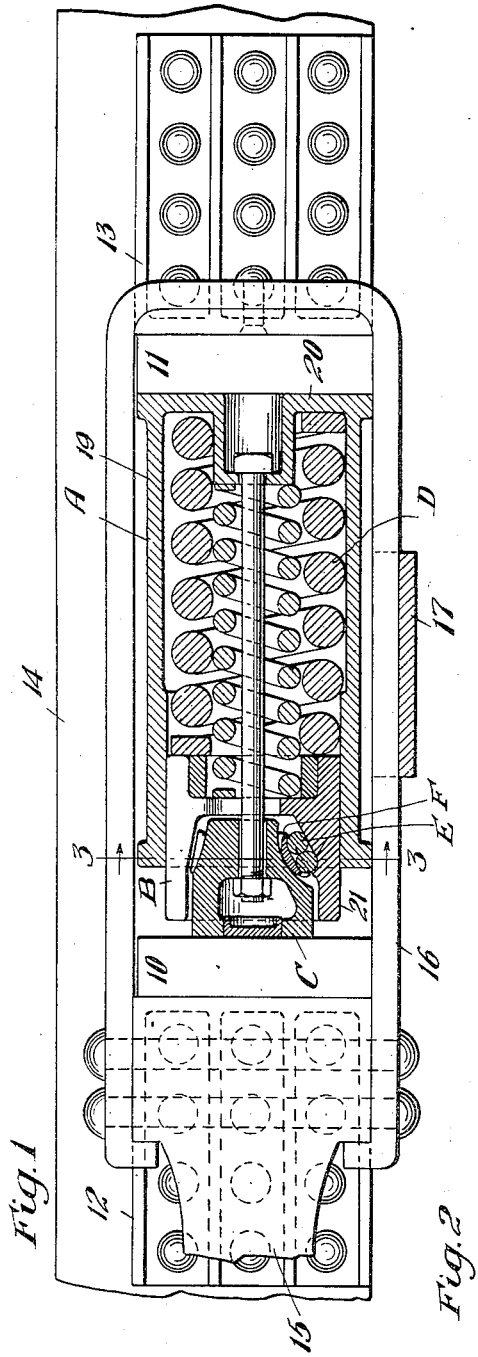
Figure 2:
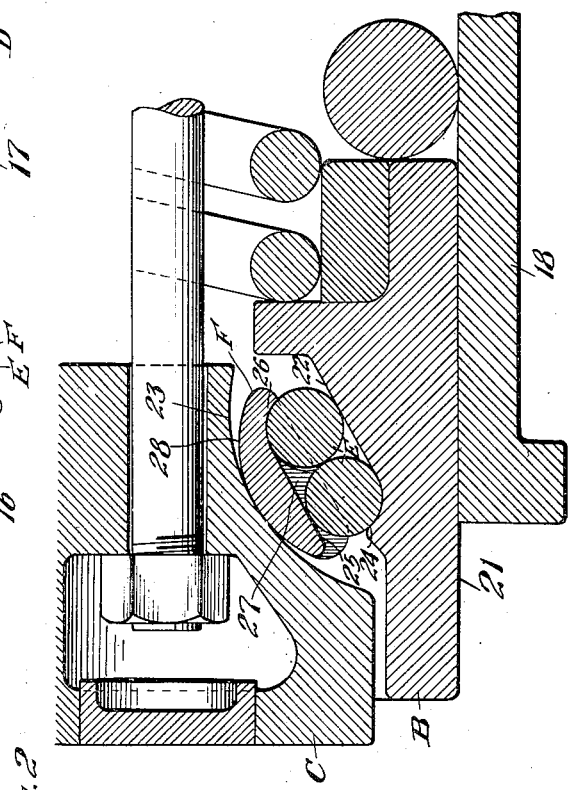

In the drawing forming a part of this specification, Figure 1 is a longitudinal, vertical, sectional view of a portion of a draft rigging showing my improvements in connection therewith. Fig. 2 is an enlarged, detail, sectional view, illustrating the arrangement of the friction elements, and more particularly the arrangement of anti-friction rolls and equalizer employed therewith. Fig. 3 is a transverse, vertical, sectional view, taken substantially on the line 3—3 of Fig. 1.

In said drawing, the shock absorbing mechanism is shown as mounted between a front follower 10 and rear follower 11, which coöperate with the usual front and rear stops 12 and 13 secured to the inner faces of the draft sills 14 of a railway car in the usual manner. The shock absorbing mechanism is operatively connected to the draw bar 15 by any suitable means, such as the usual strap yoke 16 and the parts are supported by a saddle plate 17.

The improved shock absorbing mechanism, as shown, includes a casting A, a plurality of friction shoes B, a main wedge C, a spring D, sets of anti-friction rollers E—E, and an equalizer F for each set of rollers E—E.

The casting A is formed with a friction shell proper 18 at its forward end, a spring casing 19, and a rear integral end 20. The friction shoes B, of which there are preferably three arranged circularly, are provided on their outer faces with friction surfaces 21 coöperable with the interior friction surface of the shell 18 and on their inner faces, each of the shoes B has a wedge face or surface 22, as most clearly shown in Fig. 2.

The wedge C is provided with three wedging faces 23, one opposite each of the wedging faces 22, and in practice, the wedge faces 23 will be made arcuate or concave, as clearly illustrated in Fig. 2. A pair of anti-friction rollers E—E is preferably employed between each friction shoe and the main wedge, one of said anti-friction rollers E normally bearing against a seat 24 provided therefor on the shoe. Interposed between each set of anti-friction rollers E and the corresponding wedging face 23 of the main wedge C, is the equalizer F. The latter is provided on the face adjacent the rollers E with a plain bearing surface 25 and at one end thereof is curved so as to form a seat 26 for the other roller E of the set, thereby maintaining both rollers of the set in proper relation at all times. Along its sides, each equalizer F is provided with flanges 27—27 to thereby prevent the anti-friction rollers E from becoming displaced axially of the rollers. On the face adjacent the main wedge, each equalizer F is convexed, as indicated at 28 and the radius of said convex surface is somewhat shorter than the radius of the concave surface 23 of the wedge so that the equalizer F is permitted a tilting movement with respect to the wedge C.

With the equalizers F constructed as described, it is evident that the opposed surfaces 22 of the shoes and surfaces 25 of the equalizers will always remain in true line contact with both of the rollers E—E since the equalizers F can readily adjust themselves by rocking on the main wedge to accomplish this result. In Fig. 2, the difference in curvatures of the surfaces 23 and 28 is somewhat exaggerated to more clearly disclose the manner of carrying out the invention. In actual practice, the difference will be very slight but sufficient to permit whatever rocking movement of the equalizers may be necessary to accomplish the result above described. With the arrangement described, it is evident that I am enabled to obtain all the advantages of a wide distribution of the pressure over a plurality of anti-friction rollers while at the same time avoiding the difficulties heretofore experienced due to inability to maintain a proper contact at all times between all the rollers and the opposed wedging surfaces between which they are interposed. The operation of the shock absorbing mechanism being well known, need not be described in detail.

I claim:

1. In a friction shock absorbing mechanism, the combination with a friction shell, friction shoes coöperable therewith and having inner wedge faces, a spring resistance for the shoes, and a pressure-transmitting member; of a set of anti-friction rollers interposed between the wedge face of each shoe and said member; and an equalizer coöperable with each set of anti-friction rollers and engaging said member.

2. In a friction shock absorbing mechanism, the combination with a friction shell; of a plurality of friction shoes coöperable with said shell and having inner wedge faces; spring means for resisting movement of said shoes relatively to the shell; a pressure-transmitting member having a series of wedge faces corresponding to the wedge faces of the friction shoes; and a plurality of anti-friction rollers and an equalizer interposed between each set of wedging faces on said member and friction shoes, the anti-friction rollers directly engaging one wedge face of each set and the equalizer being rockable with respect to the other wedge face of each set.

3. In a friction shock absorbing mechanism including two members arranged to have pressure transmitted from one to the other, the combination with a pair of anti-friction rollers engaging one of said members, of an equalizer interposed between said anti-friction rollers and the other of said members, said equalizer being adjustable with respect to the last named member.

4. In a shock absorbing mechanism, the combination with a friction shell and a plurality of friction shoes coöperable therewith, each of said shoes having a wedge face on its inner side; of spring means for resisting movement of said shoes relatively to the shell; a main wedge having a series of wedge faces opposed to the wedge faces of the shoes; a pair of anti-friction rollers bearing on the wedge face of each shoe; and an equalizer for each pair of anti-friction rollers, said equalizer engaging the anti-friction rollers on one side and the corresponding wedge face of the main wedge on the other side, the engaging faces of the wedge and the equalizers being curved on different radii to thereby permit the equalizers to rock with respect to the main wedge.

5. In a shock absorbing mechanism, the combination with a casting having a friction shell and a spring casing formed integrally therewith; of a spring mounted within said casing; a circularly arranged set of friction shoes mounted within the shell, each of said shoes having a wedge face on its inner side; a main wedge having a series of concave wedge faces opposed to the wedge faces of the shoes; an equalizer rockably mounted on each of said concave faces of the main wedge; and a pair of anti-friction rollers interposed between each equalizer and the corresponding friction shoe.

In witness that I claim the foregoing I have hereunto subscribed my name this 29th day of Jan., 1918.

JOHN F. O'CONNOR